United States Patent
Chen

(10) Patent No.: US 7,114,993 B2
(45) Date of Patent: Oct. 3, 2006

(54) MULTIPURPOSE MEMORY CARD ADAPTER

(75) Inventor: Yuan-Hua Chen, Taoyuan Hsien (TW)

(73) Assignee: Kingconn Technology Co., Ltd., Taoyuan Hsien (TW)

( * ) Notice: Subject to any disclaimer, the term of this patent is extended or adjusted under 35 U.S.C. 154(b) by 0 days.

(21) Appl. No.: 11/088,729

(22) Filed: Mar. 25, 2005

(65) Prior Publication Data

US 2006/0009078 A1    Jan. 12, 2006

(30) Foreign Application Priority Data

Jul. 7, 2004    (TW) ............................. 93210716 U

(51) Int. Cl.
*H01R 24/00*    (2006.01)
(52) U.S. Cl. ...................... 439/630; 361/735
(58) Field of Classification Search ................ 439/630, 439/945; 361/735, 737
See application file for complete search history.

(56) References Cited

U.S. PATENT DOCUMENTS 6,540,523 B1 *   4/2003   Kung et al. .................... 439/64
6,738,259 B1 *   5/2004   Le et al. ...................... 361/737
6,776,653 B1 *   8/2004   Hsiao ...................... 439/541.5

* cited by examiner

*Primary Examiner*—Tho D. Ta
*Assistant Examiner*—Vanessa Girardi
(74) *Attorney, Agent, or Firm*—Rosenberg, Klein & Lee

(57) ABSTRACT

A multipurpose memory card adapter including a base and a cover. The base has first conductive pieces corresponding to connecting fingers of memory cards of Secure Digital (SD) card, Multimedia Card (MMC) and Reduced Size Multimedia Card (RS-MMC). A plurality of guide pieces is formed at a front end of the first conductive pieces to allow for a smooth insertion of the memory cards in position. The base further includes second conductive pieces corresponding to connecting fingers of mini SD card. A first end stop at which the mini SD card to be inserted into the base arrives is located at a farther position away from an insertion opening than a second end stop for the SD card and the MMC card. A side stop and a guide chamfer are formed between the first end stop and the second end stop. Meanwhile, a detecting piece and a write protection piece are provided at one side of the base. In addition, a plurality of mounting bosses is formed at the periphery of the base. The cover includes a plurality of mounting holes corresponding to the mounting bosses of the base as well as a grounding piece at a corner of both sides.

1 Claim, 4 Drawing Sheets

MULTIPURPOSE MEMORY CARD ADAPTER

BACKGROUND OF THE INVENTION

1. Field of the Invention

The invention relates to a multipurpose memory card adapter, and more particularly, to an adapter for various memory cards.

2. Description of the Related Art

Nowadays, memory cards in various formats exist in the market, and they are continuously developed in different formats. Therefore, corresponding memory card adapters are required for the respective memory cards in different formats. In order to facilitate the use of memory cards and to expand their application scopes, different kinds of memory card adapters are required to be integrated in a body. So, a single memory card adapter can be applied to different memory cards. However, a memory card adapter for SD (Secure Digital), mini SD card, Multimedia Card (MMC), RS-MMC (Reduced Size Multimedia Card), MMC card 4.0 and RS-MMC card 4.0 is still unavailable in the market. This brings much difficulty in use.

SUMMARY OF THE INVENTION

It is a primary object of the invention to eliminate the above-mentioned drawback and to provide a multipurpose memory card adapter that can be shared by SD, mini SD, MMC and RS-MMC for expanding the application scopes and facilitating the use of the memory card adapter.

It is another object of the invention to provide a multipurpose memory card adapter that can be further applied to MMC 4.0 and RS-MMC 4.0 for expanding the application scopes and facilitating the use of the memory card adapter in an intensified way.

In order to achieve the above-mentioned objects, a multipurpose memory card adapter comprises:

a base having first conductive pieces corresponding to connecting fingers of memory cards of Secure Digital (SD) card, Multimedia Card (MMC) and RS-MMC, a plurality of guide pieces being formed at a front end of the first conductive pieces to allow for a smooth insertion of the memory cards in position, the base further includes second conductive pieces corresponding to connecting fingers of mini SD card, a first end stop at which the mini SD card to be inserted into the base arrives being located at a farther position away from an insertion opening than a second end stop for the SD card and the MMC card, a side stop and a guide chamfer being formed between the first end stop and the second end stop, a plurality of mounting bosses being formed at the periphery of the base; and a cover having a plurality of mounting holes corresponding to the mounting bosses of the base.

BRIEF DESCRIPTION OF THE DRAWINGS

The accomplishment of this and other objects of the invention will become apparent from the following descriptions and its accompanying drawings of which.

DETAILED DESCRIPTION OF THE PREFERRED EMBODIMENT

Figure 1:
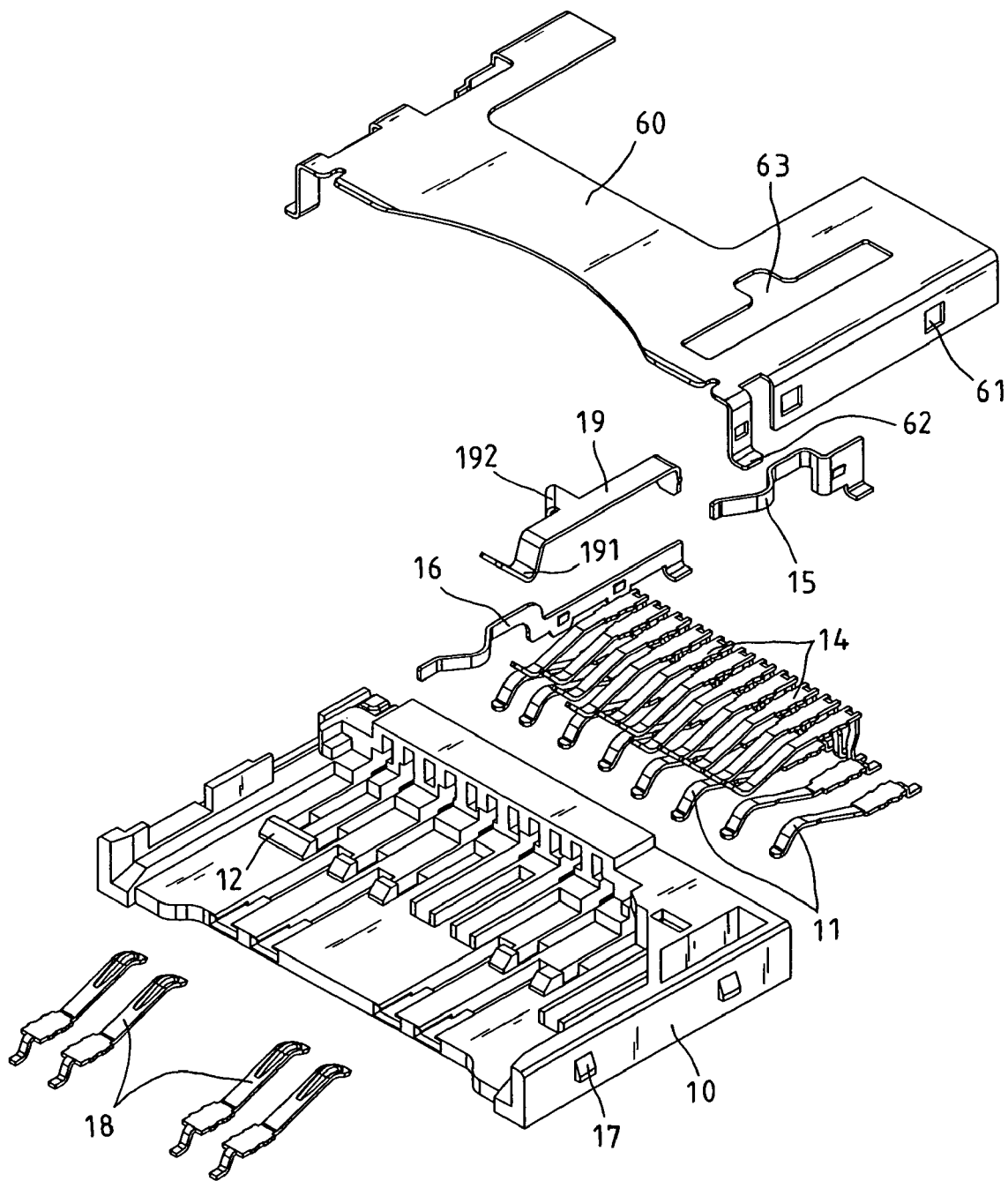
FIG. 1 is a perspective exploded view of a multipurpose memory card adapter of the invention.
Figure 2:
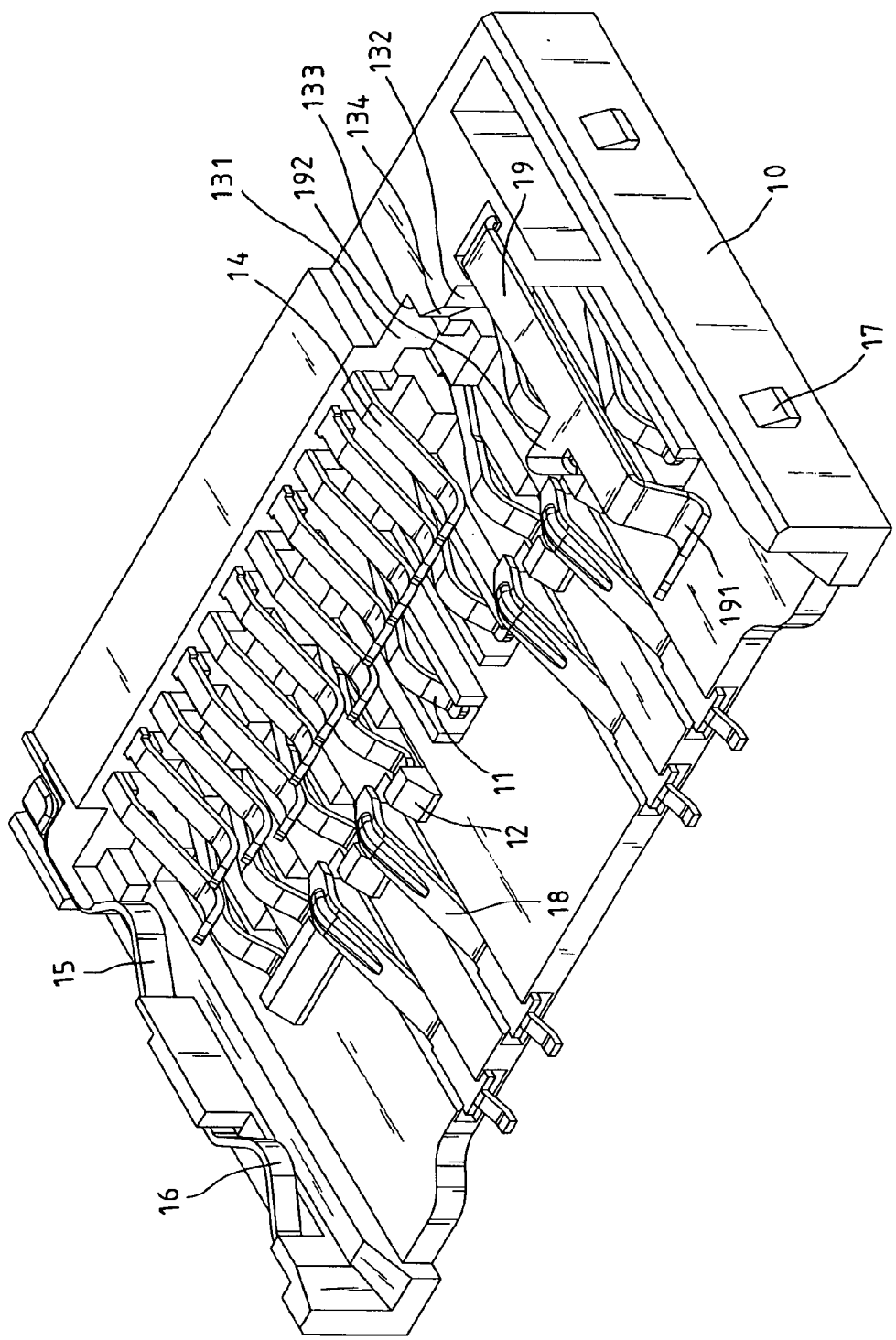
FIG. 2 is a perspective view of a base of the multipurpose memory card adapter of the invention after assembly.
Figure 3:
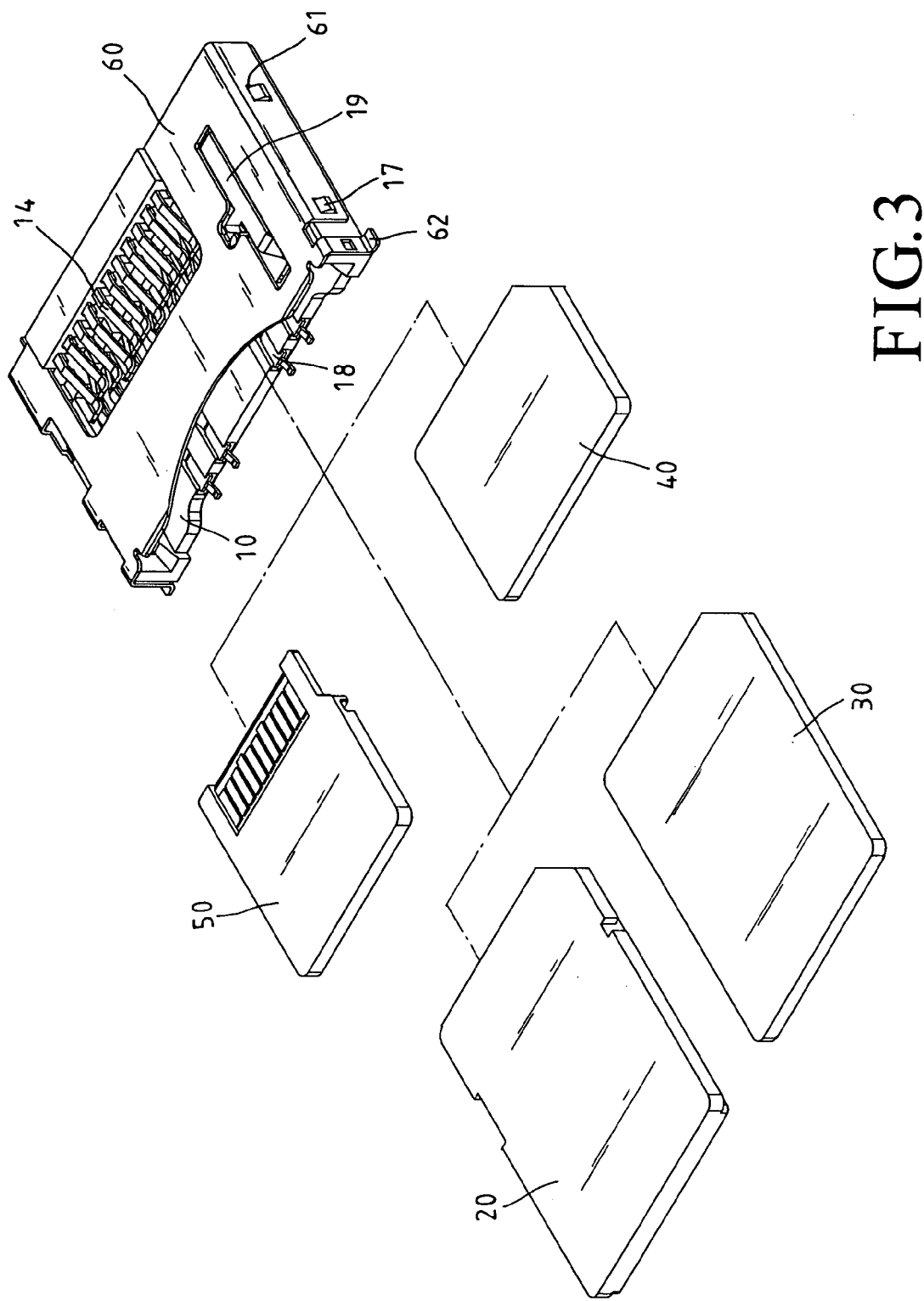
FIG. 3 is a perspective view of the memory card adapter of the invention.

First of all, referring to FIGS. 1 through 3, a multipurpose memory card adapter in accordance with the invention includes a base 10 and a cover 60.

The base 10 has first conductive pieces 11 corresponding to connecting fingers of memory cards of Secure Digital (SD) card 20, Multimedia Card (MMC) 30 and RS-MMC 40. A plurality of guide pieces 12 is formed at a front end of the first conductive pieces 11 to allow for a smooth insertion of the memory cards in position. The base 10 further includes second conductive pieces 14 corresponding to connecting fingers of mini SD card 50. A first end stop 131 at which the mini SD card 50 to be inserted into the base 10 arrives is located at a farther position away from an insertion opening than a second end stop 132 for the SD card 20 and the MMC card 30. A side stop 133 and a guide chamfer 134 are formed between the first end stop 131 and the second end stop 132. Meanwhile, a detecting piece 15 and a write protection piece 16 are provided at one side of the base 10. In addition, a plurality of mounting bosses 17 is formed at the periphery of the base 10.

The cover 60 includes a plurality of mounting holes 61 corresponding to the mounting bosses 17 of the base 10 as well as a grounding piece 62 at a corner of both sides.

Moreover, the base 10 further includes third conductive pieces 18 at the front end of the first conductive pieces 11 for creating an electric connection with the MMC card 4.0 and RS-MMC card 4.0. In addition, the base 10 includes a limit strip 19 installed at a position of the right side of the inserted mini SD card 50. The limit strip 19 has a concave portion 191 at a front end thereof. A side limit 192 is formed at the inner side of the limit strip 19. The cover 60 includes an elongated slot 63 corresponding to the limit strip 19.

Figure 4:
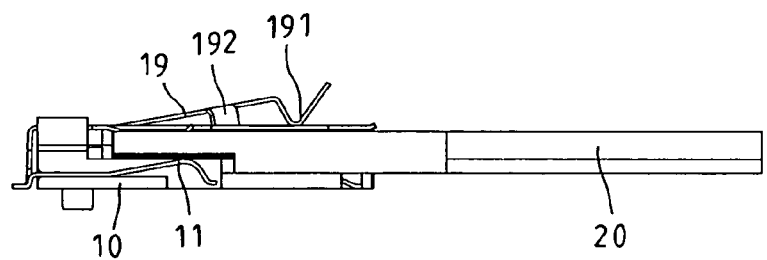
FIG. 4 is a cutaway view of the memory card adapter for six kinds of memory cards.
Figure 4:
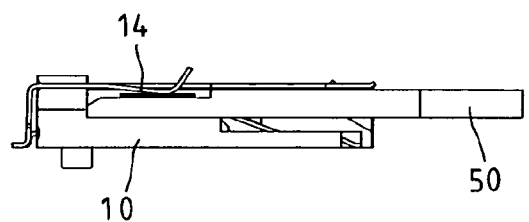
Figure 4:
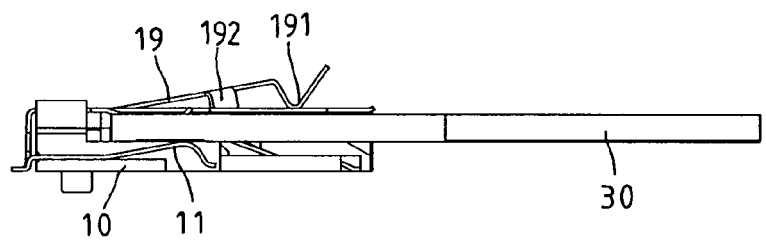
Figure 4:
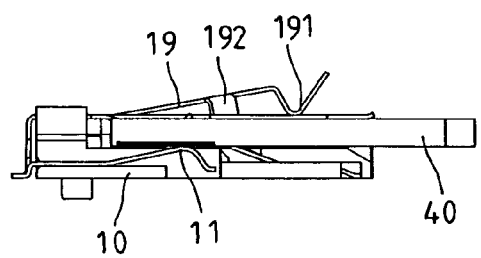
Figure 4:
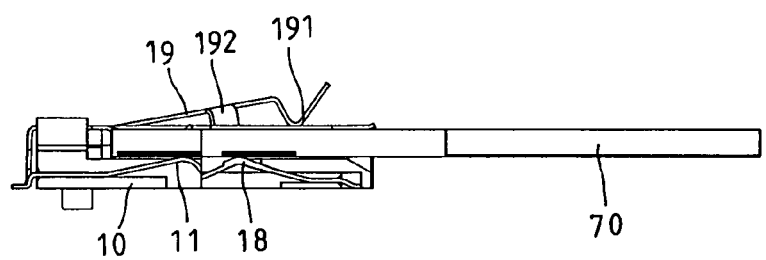
Figure 4:
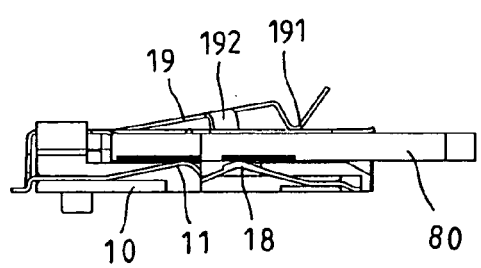

Based on the above-mentioned configuration, the multipurpose memory card adapter in accordance with the invention can be adapted to receive SD card 20, the mini SD card 50, the Multimedia Card (MMC) 30, the RS-MMC 40, the MMC card 4.0 (70), and the RS-MMC card 4.0 (80) as shown in FIG. 4. All of the above-mentioned memory cards create an electric connection to the first conductive pieces 11 except the mini SD card 50 to the second conductive pieces 14. Meanwhile, the MMC card 4.0 (70) and the RS-MMC card 4.0 (80) further require additional third conductive pieces 18 for the electric connection.

The mini SD card 50 has a smaller width so that the side limit 192 of the limit strip 19 is used to guide the mini SD card 50 in position. The limit strip 19 will be raised by means of the concave portion 191 when the other memory cards are inserted into the base 10. So, the insertion of the memory cards won't be affected. Accordingly, the multipurpose memory card adapter in accordance with the invention can applied to six kinds of memory cards, thereby expanding the application scopes and facilitating the use of the memory card adapter.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A multipurpose memory card adapter comprising:

a) a base having first conductive pieces corresponding to connecting fingers of memory cards of Secure Digital (SD) card, Multimedia Card (MMC) and Reduced Size Multimedia Card (RS-MMC), a plurality of guide pieces being formed at a front end of the first conductive pieces to allow for a smooth insertion of the memory cards in position, the base further including second conductive pieces corresponding to connecting fingers of mini SD card, a first end stop at which the mini SD card to be inserted into the base arrives being located at a farther position away from an insertion opening than a second end stop for the SD card and the MMC card, a side stop and a guide chamfer being formed between the first end stop and the second end stop, a plurality of mounting bosses being formed at the periphery of the base; and, b) a cover having a plurality of mounting holes corresponding to the mounting bosses of the base;

wherein the base includes a limit strip installed at a position of the right side of the inserted mini SD card, and wherein the limit strip has a concave portion at a front end thereof, and wherein a side limit is formed at the inner side of the limit strip, and wherein the cover includes an elongated slot corresponding to the limit strip.

* * * * *